(12) United States Patent
Kononewsky et al.

(10) Patent No.: US 11,300,109 B2
(45) Date of Patent: Apr. 12, 2022

(54) APPARATUS FOR GENERATING ENERGY

(71) Applicant: CLEAN POWR PTY LTD, Sydney (AU)

(72) Inventors: Anatole Kononewsky, Sydney (AU); Mark McCutcheon, Sydney (AU)

(73) Assignee: CLEAN POWR PTY LTD, Sydney (AU)

( * ) Notice: Subject to any disclaimer, the term of this patent is extended or adjusted under 35 U.S.C. 154(b) by 0 days.

(21) Appl. No.: 16/623,697

(22) PCT Filed: Jul. 3, 2018

(86) PCT No.: PCT/AU2018/050686
§ 371 (c)(1),
(2) Date: Dec. 17, 2019

(87) PCT Pub. No.: WO2019/006499
PCT Pub. Date: Jan. 10, 2019

(65) Prior Publication Data
US 2020/0158095 A1  May 21, 2020

(30) Foreign Application Priority Data

Jul. 3, 2017 (AU) ............................. 2017902579

(51) Int. Cl.
| F03G 3/08 | (2006.01) |
| F03G 7/10 | (2006.01) |
| H02K 53/00 | (2006.01) |

(52) U.S. Cl.
CPC .............. *F03G 3/08* (2013.01); *F03G 7/10* (2013.01); *H02K 53/00* (2013.01)

(58) Field of Classification Search
CPC .............. F03G 3/08; F03G 7/10; H02K 53/00
See application file for complete search history.

(56) References Cited

U.S. PATENT DOCUMENTS

| 3,342,998 A | 9/1967 | Anderson |
| 4,352,023 A | 9/1982 | Sachs et al. |
| (Continued) | | |

FOREIGN PATENT DOCUMENTS

| CN | 103498767 A | 1/2014 |
| CN | 204226095 U | 3/2015 |
| (Continued) | | |

OTHER PUBLICATIONS

Written Opinion of the International Searching Authority for International Application No. PCT/AU2018/050686 dated Oct. 12, 2018.

(Continued)

*Primary Examiner* — Patrick Cicchino
(74) *Attorney, Agent, or Firm* — Neal, Gerber & Eisenberg LLP

(57) ABSTRACT

The present disclosure relates broadly to an energy apparatus comprising a flywheel assembly, drive means operatively coupled to the flywheel assembly, and an energy generator operatively coupled to the flywheel assembly via extraction means. The drive means includes biasing means connected to an actuator arranged to provide stored energy in the biasing means. The apparatus also comprises transmission means coupled between the flywheel assembly and the biasing means wherein release of stored energy from the biasing means provides a driving force which effects rotation of the flywheel assembly which gains momentum. The extraction means is arranged for rapid extraction of the momentum of the flywheel assembly. The energy generator generates electricity from the rapidly extracted momentum of the flywheel assembly.

30 Claims, 10 Drawing Sheets

(56) References Cited

U.S. PATENT DOCUMENTS

| | | | |
|---|---|---|---|
| 5,337,654 A * | 8/1994 | Broberg | F24C 15/322 |
| | | | 126/21 A |
| 6,624,542 B1 | 9/2003 | Gabrys et al. | |
| 7,321,208 B2 * | 1/2008 | Ogura | B60R 11/0235 |
| | | | 318/1 |
| 7,541,783 B2 * | 6/2009 | Kurosawa | H02K 7/025 |
| | | | 310/74 |
| 8,373,368 B2 * | 2/2013 | Achiriloaie | F03G 3/08 |
| | | | 318/161 |
| 2007/0120430 A1 | 5/2007 | Kurosawa | |
| 2008/0143302 A1 * | 6/2008 | Pierce | H02K 53/00 |
| | | | 322/4 |
| 2008/0190701 A1 * | 8/2008 | Stavropoulos | F03G 1/06 |
| | | | 185/40 R |
| 2010/0071999 A1 * | 3/2010 | Leclerc | F03G 1/00 |
| | | | 185/38 |
| 2010/0117375 A1 | 5/2010 | Kwok | |
| 2017/0022981 A1 * | 1/2017 | Sun | F03G 3/06 |
| 2019/0305663 A1 * | 10/2019 | Lin | H02K 1/12 |

FOREIGN PATENT DOCUMENTS

| | | |
|---|---|---|
| JP | 2002138945 A | 5/2002 |
| WO | WO 2010/109487 A2 | 9/2010 |
| WO | WO 2015/039527 A1 | 3/2015 |
| WO | WO 2015/156667 | 10/2015 |
| WO | WO 2016/036346 A1 | 3/2016 |
| WO | WO-2017152295 A1 * | 9/2017 ............... F03G 7/10 |

OTHER PUBLICATIONS

International Preliminary Report on Patentability for International Application No. PCT/AU2018/050686 dated May 23, 2019.

Supplementary European Search Report and Written Opinion for European Application No. EP 18 828 745 dated Feb. 16, 2021, 4 pages.

Chinese Office Action (with translation) for Chinese Patent Application No. 201880042549.3 dated Oct. 26, 2021 (20 Pages).

* cited by examiner

APPARATUS FOR GENERATING ENERGY

PRIORITY CLAIM

This application is a national stage application of PCT/AU2018/050686, filed on Jul. 3, 2018, which claims the benefit of and priority to Australian Patent Application No. 2017902579, filed on Jul. 3, 2017, the entire contents of which are each incorporated by reference herein.

TECHNICAL FIELD

The present disclosure relates broadly to an apparatus for producing energy typically in the form of electricity.

BACKGROUND

There are a variety of flywheel power generators known in the art. These power generators generally include a starter motor arranged to rotate a flywheel which in turn drives an electric generator for producing electrical power. U.S. Patent Publication No. 2007/0120430 describes a power generator of this prior art type including a series of permanent magnets which cooperate with electrically-pulsed stationary electromagnets in a magnetic circuit which drives the flywheel after a predetermined number of rotations. The flywheel is coupled to the electric generator which applies the electrical pulses to the stationary electromagnets until the flywheel reaches a sufficient speed and continues to rotate under its own inertia. The flywheel rotates at a relatively high speed of around 400 rpm. U.S. Pat. No. 6,624,542 describes another prior art power generator having a motor designed to accelerate a flywheel to full speed wherein its rotational inertia is converted to electrical power in an associated generator. In order to efficiently operate the generator at high operating speeds of up to 40,000 rpm the power generator includes a cooling system designed to absorb heat generated during discharging of the flywheel power source.

SUMMARY

According a first aspect of the present disclosure there is provided an energy apparatus comprising:
 a flywheel assembly arranged for rotation;
 drive means operatively coupled to the flywheel assembly, the drive means including biasing means connected to an actuator arranged to bias the biasing means providing stored energy in the biasing means;
 transmission means coupled between the flywheel assembly and the biasing means wherein release of the stored energy from the biasing means provides a driving force which drives the transmission means to effect rotation of the flywheel assembly which gains momentum;
 extraction means operatively coupled to the flywheel assembly for rapid extraction of the momentum of the flywheel assembly;
 an energy generator associated with the extraction means for generating energy from the rapidly extracted momentum of the flywheel assembly.

According to a second aspect of the disclosure there is provided an energy storage apparatus:
 a flywheel assembly arranged for rotation;
 drive means operatively coupled to the flywheel assembly, the drive means including biasing means connected to an actuator arranged to bias the biasing means providing stored energy in the biasing means;
 transmission means coupled between the flywheel assembly and the biasing means wherein release of the stored energy in the biasing means provides a driving force which drives the transmission means to effect rotation of the flywheel assembly which gains momentum.

In certain embodiments, the actuator includes a drive motor coupled to the biasing means which is biased under the influence of the drive motor thus providing the stored energy in the biasing means. In certain such embodiments, the biasing means includes a spring coupled to the drive motor which is rotated to stress the spring thus providing stored spring energy which on release provides the driving force of the biasing means. In certain such embodiments, the spring is a torsion spring assembly connected to the transmission means, the torsion spring assembly including a torsion spring configured to be wound relative to the transmission means via the drive motor for stressing of the torsion spring which is arranged to release its stored spring energy for thus providing the driving force for rotation of the flywheel assembly. In certain embodiments, the spring is a constant torque spring assembly connected to the transmission means, the constant torque spring assembly including a constant torque spring configured to be wound relative to the transmission means via the drive motor for stressing of the constant torque spring which is arranged to release its stored spring energy for thus providing the driving force for rotation of the flywheel assembly. In certain embodiments, the drive motor is designed to rapidly bias the biasing means for a reduced period of time to provide the stored spring energy in the biasing means.

In certain embodiments, the biasing means is designed to be biased via the drive motor a reduced displacement relative to maximum displacement achievable with the biasing means. In certain such embodiments, the biasing means is designed to be biased the reduced displacement in consecutive stages. In certain embodiments, the biasing means is designed to be biased the reduced displacement in a succeeding stage prior to substantially full relaxation of the biasing means in the preceding stage of the consecutive stages.

In certain embodiments, the transmission means includes a drive coupling connected between the biasing means and the flywheel assembly for rotation of the flywheel assembly. In certain such embodiments, the drive coupling includes a continuous drive belt wrapped about the biasing means and a periphery of the flywheel assembly. Alternatively the drive belt is wrapped about the biasing means and a relatively small diameter spindle associated with the flywheel assembly. In certain embodiments, the drive means also includes a drive clutch operatively coupled to the biasing means to disengage the biasing means from either the actuator or the transmission means substantially simultaneous with or shortly after the stored energy in the biasing means being at least predominantly released thereby permitting continued rotation of the flywheel assembly independent of the actuator.

In certain embodiments, the extraction means includes an extraction coupling assembly arranged to cooperate with the flywheel assembly for rapid rotation of the energy generator relative to the flywheel assembly. In certain such embodiments, the energy generator is an electromagnetic generator including a rotor mounted within a stator which together cooperate to produce electricity under rapid rotation of the rotor which is operatively connected to the extraction means. In certain embodiments, the extraction means also includes a buffer arranged between the extraction coupling assembly and the rotor to gradually accelerate the rotor for rapid rotation on extraction of the momentum of the flywheel assembly. In certain embodiments, the extraction coupling assembly includes a continuous extraction belt wrapped about a periphery of the flywheel assembly and a relatively small diameter pulley associated with the rotor, said pulley being configured relative to the rotor for its rapid rotation. In certain embodiments, the electromagnetic generator is operatively coupled to the actuator of the drive means whereby the electricity produced by the electromagnetic generator is recycled to power the actuator. In certain embodiments, the electromagnetic generator is associated with one or more capacitors for storing the electricity produced by said generator, the capacitors associated with one or more batteries which are charged by the stored electricity and arranged to power the actuator.

In certain embodiments, the extraction means also includes an extraction clutch operatively coupled to the extraction coupling assembly to disengage either the flywheel assembly or the energy generator from the extraction coupling assembly while the transmission means is effecting rotation of the flywheel assembly, thereby permitting rotation of the flywheel assembly by the transmission means independent of the extraction means. In certain such embodiments, the extraction coupling assembly is arranged to engage either the flywheel assembly or the energy generator for extraction of the flywheel assembly momentum once the flywheel assembly has built up sufficient momentum.

In certain embodiments, the extraction coupling assembly includes a gear assembly operatively coupled to the flywheel assembly and the energy generator to increase rotational speed of the generator relative to the flywheel assembly. In certain such embodiments, the gear assembly includes a continuously variable transmission.

In certain embodiments, the apparatus also comprises an outer chamber containing a fluid, the flywheel assembly housed for rotation within the outer chamber and designed for substantial neutral buoyancy within the fluid contained in the outer chamber. In certain such embodiments, the flywheel assembly includes a buoyant vessel within which a flywheel is mounted, said buoyant vessel being sufficiently buoyant to ensure the flywheel assembly is substantially neutrally buoyant within the fluid contained in the outer chamber. In certain embodiments, the flywheel is constructed of a relatively dense material and is of a substantially toroidal shape. In certain embodiments, the buoyant vessel is shaped in the form of a substantially cylindrical drum.

In certain embodiments, the flywheel assembly includes a rotating member connected to a flywheel, the rotating member operatively coupled to both the drive means and the extraction means. In certain such embodiments, the flywheel includes a shaft oriented substantially vertical and fixed coaxially to the rotating member, and a plurality of pivoted arms each at or adjacent one end pivotally coupled to the shaft. In certain embodiments, the flywheel also includes a plurality of weighted elements connected to an opposing end of respective of the plurality of pivoted arms.

In certain embodiments, the apparatus is one of a plurality of the apparatus networked with one another.

According to a third aspect of the disclosure there is provided a method for generating energy, said method comprising the steps of:
  actuating biasing means associated with a flywheel assembly, said actuation of the biasing means biasing it thereby providing stored energy in the biasing means;
  releasing the stored energy in the biasing means to provide a driving force to the flywheel assembly to effect rotation of the flywheel assembly which gains momentum;
  rapidly extracting the momentum of the flywheel assembly;
  generating energy via an energy generator arranged to harness the rapidly extracted momentum of the flywheel assembly.

According to a fourth aspect of the disclosure there is provided a method for storing energy, said method comprising the steps of:
  actuating biasing means associated with a flywheel assembly, said actuation of the biasing means biasing the biasing means and thus providing stored energy in the biasing means;
  releasing the stored energy in the biasing means to provide a driving force to the flywheel assembly to effect rotation of the flywheel assembly.

In certain embodiments, actuation of the biasing means is performed rapidly for a reduced period of time to provide the stored energy in the biasing means compared to a relatively slow biasing of the biasing means for an extended period of time. In certain such embodiments, the biasing means is biased a reduced displacement relative to near maximum displacement achievable with the biasing means. In certain embodiments, the biasing means is biased the reduced displacement in consecutive stages. In certain embodiments, the biasing means is biased the reduced displacement in a succeeding stage prior to substantially full relaxation of the biasing means in the preceding stage of the consecutive stages.

In certain embodiments, the step of releasing the stored energy in the biasing means involves disengagement of the biasing means from either an associated actuator or transmission means substantially simultaneous with or shortly after the stored energy in the biasing means being predominantly released thereby permitting continued rotation of the flywheel assembly.

In certain embodiments, the step of rapidly extracting the momentum of the flywheel assembly involves rapidly rotating the energy generator relative to the flywheel assembly. In certain such embodiments, the ratio of the rotational speed of the energy generator relative to the flywheel assembly is at least around 100 to 1. In certain embodiments, the energy generator is gradually accelerated for rapid rotation relative to the flywheel assembly.

In certain embodiments, the energy generated from the energy generator is recycled for actuating the biasing means in providing the stored energy in the biasing means.

In certain embodiments, the method also comprises the step of governing the rotational speed of the flywheel assembly at a substantially constant speed.

Additional features are described in, and will be apparent from the following Detailed Description and the figures.

BRIEF DESCRIPTION OF DRAWINGS

In order to achieve a better understanding of the nature of the present disclosure several embodiments of an apparatus for producing energy will now be described, by way of example only, with reference to the accompanying drawings in which.

DETAILED DESCRIPTION

Figure 1:
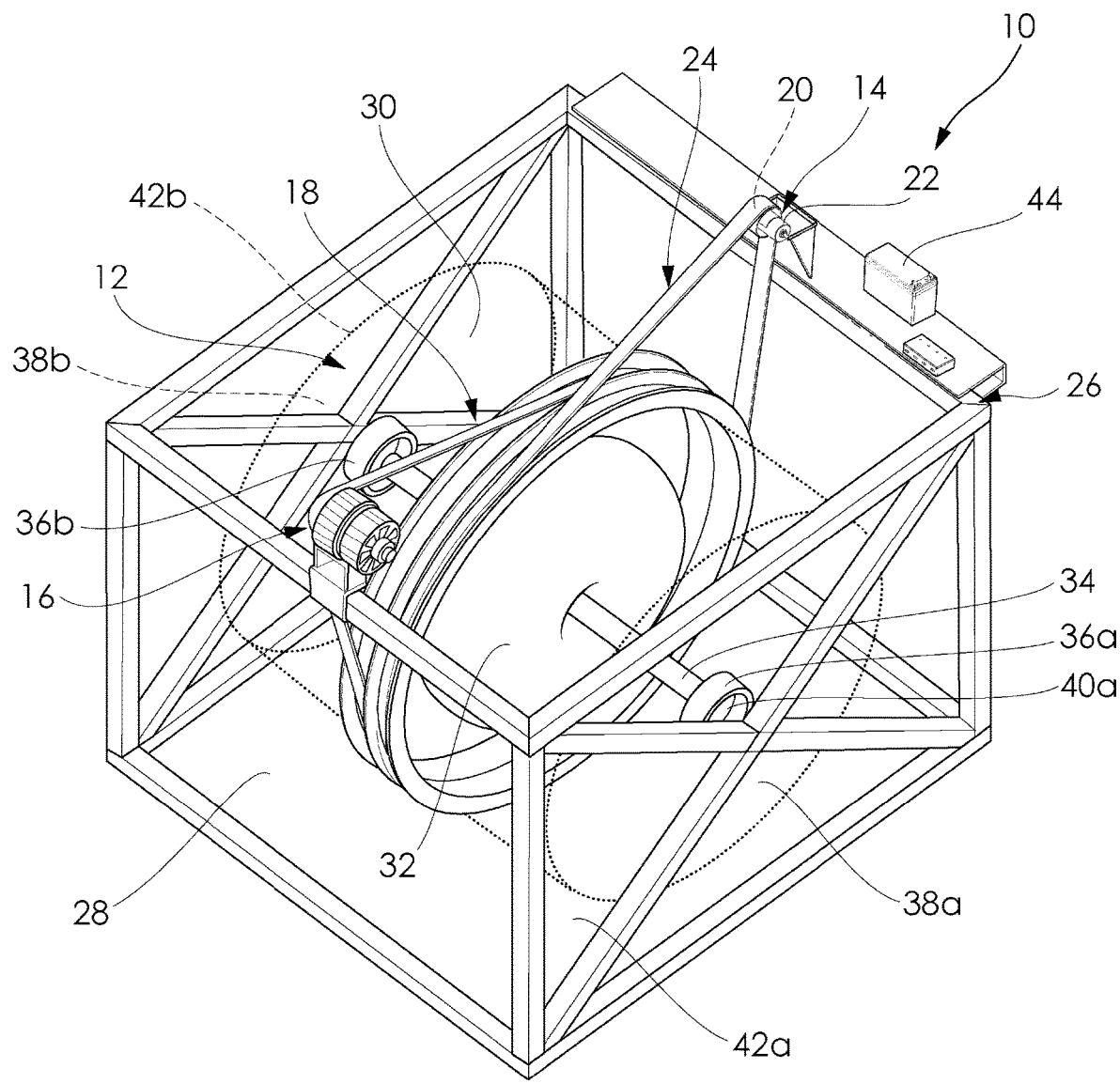
FIG. 1 is a perspective view of a general arrangement of an apparatus for producing energy according to a first embodiment of the disclosure.

As shown in FIG. 1 there is an apparatus 10 according to a first embodiment of the disclosure for producing energy, typically in the form of electrical energy or electricity. The apparatus 10 generally comprises a flywheel assembly 12, drive means 14 operatively coupled to the flywheel assembly 12, and an energy generator 16 operatively coupled to the flywheel assembly 12 via extraction means 18. The drive means 14 of this embodiment includes biasing means 20 connected to an actuator 22 arranged to provide stored energy in the biasing means 20. The apparatus 10 of this embodiment also comprises transmission means 24 coupled between the flywheel assembly 12 and the biasing means 20 wherein release of stored energy from the biasing means 20 provides a driving force which effects rotation of the flywheel assembly 12 which gains momentum. The extraction means 18 is arranged for rapid extraction of the momentum of the flywheel assembly 12. The energy generator 16 generates energy or in this case electricity from the rapidly extracted momentum of the flywheel assembly 12.

In this embodiment the apparatus 10 also comprises an outer chamber 26 within which the flywheel assembly 12 is contained for rotation. The outer chamber 26 is prismatic or cube-shaped and designed to contain a fluid 28 within which the flywheel assembly 12 is at least partly submerged. The flywheel assembly 12 in this embodiment includes a buoyant vessel 30 within which a flywheel 32 is mounted. The flywheel 32 is shaped substantially toroidal and constructed of a relatively dense material such as steel. The flywheel 32 is of a relatively large mass providing significant inertia on rotation and delivering relatively large momentum at relatively low rotational speeds. The buoyant vessel 30 is in the form of a cylindrical drum and is designed so that the flywheel assembly 12 is substantially neutrally buoyant within the fluid 28 of the outer chamber 26. That is, the buoyancy of the cylindrical drum 30 largely counteracts the flywheel 32 weight force providing the flywheel assembly 12 with substantial neutral buoyancy. The specific gravity of the fluid 28 within the outer chamber 26 will influence the required buoyancy of the cylindrical drum 30 to achieve neutral buoyancy for the flywheel assembly 12. For example, a higher specific gravity fluid relies upon less of a buoyant drum 30 (having a smaller volume) and/or will tolerate a heavier flywheel 32 whilst maintaining neutral buoyancy.

In this example the toroidal-shaped flywheel 32 is fixed axially within the buoyant vessel 30 via flywheel shaft 34. The buoyant vessel or drum 30 includes a pair of bearing elements 36a and 36b axially aligned with the flywheel shaft 34 and mounted to opposing faces 38a and 38b respectively of the buoyant drum 30. The bearing elements 36a/b are rotationally mounted to corresponding bearing elements 40a and 40b secured to opposing respective inside faces 42a and 42b of the outer chamber 26. The flywheel assembly 12 is thus free to rotate within the outer chamber 26 and it is likely that under neutral buoyancy the flywheel assembly 12 will impart minimal load and friction to the bearing elements 36a/40a and 36b/40b.

Figure 2:
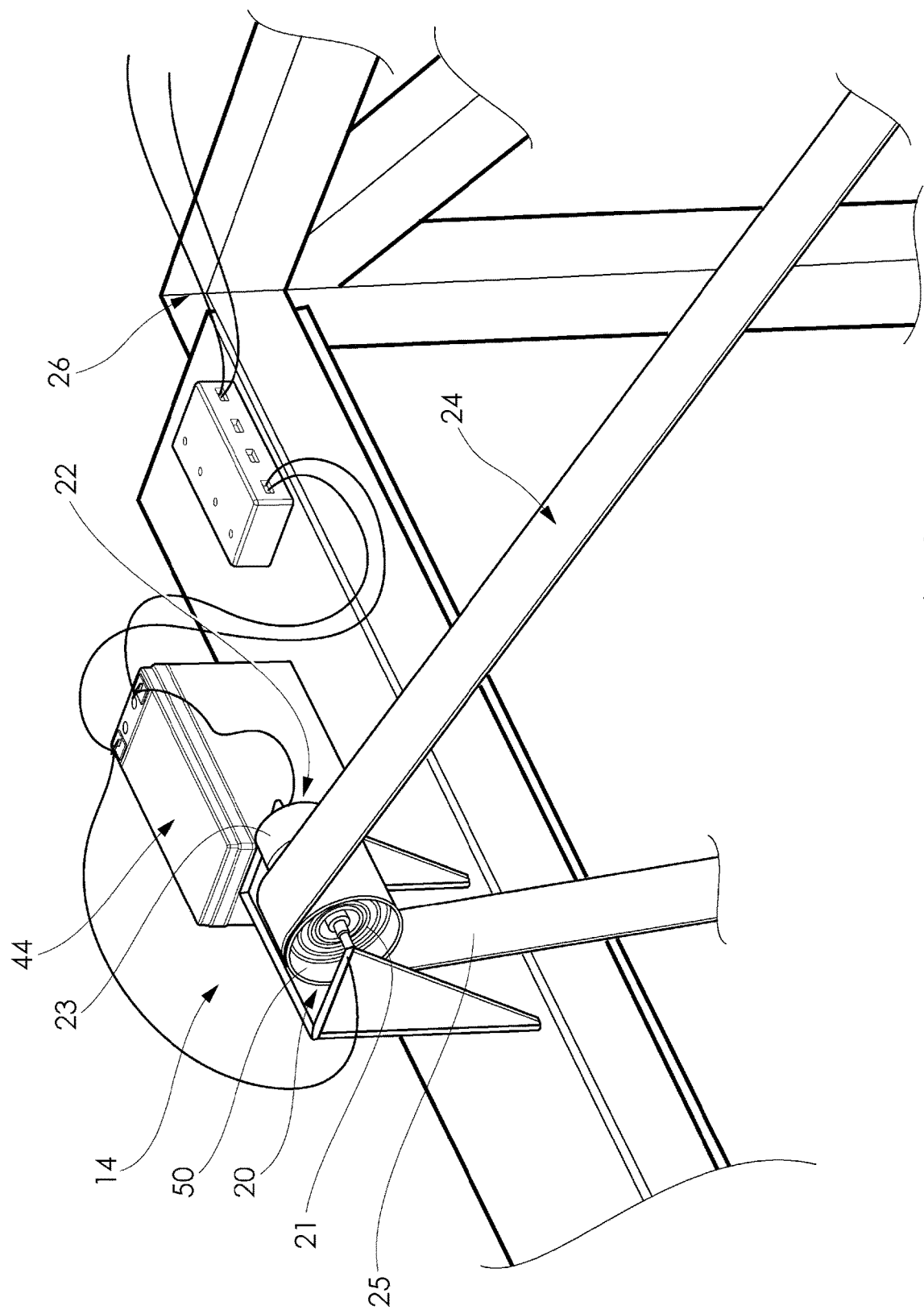
FIGS. 2 and 3 are enlarged perspective views of drive means and part of transmission means taken from the apparatus of the embodiment of FIG. 1.
Figure 3:
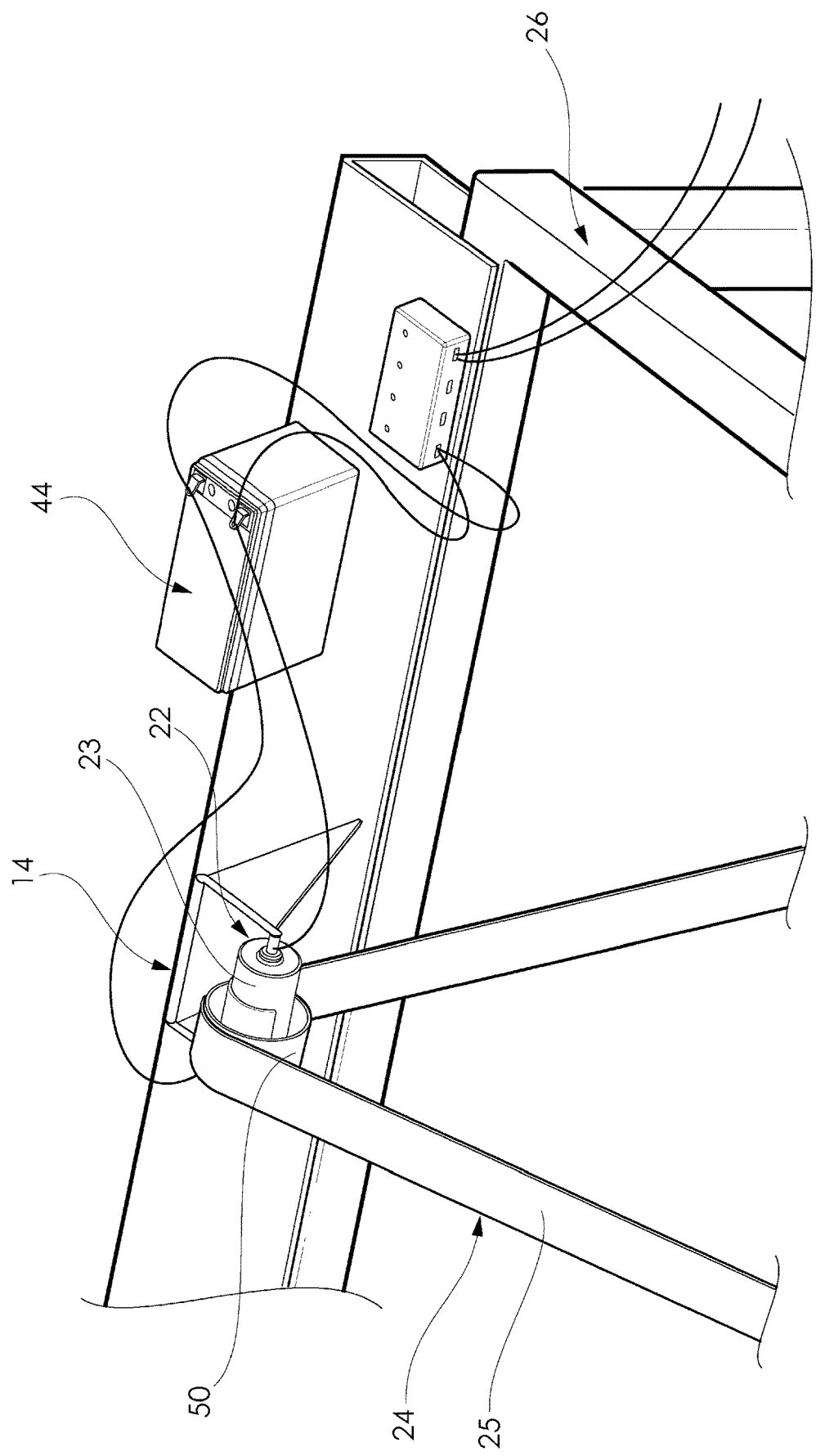

As best seen in FIGS. 2 and 3 the drive means 14 of this embodiment includes the biasing means 20 in the form of a spiral torsion spring 21 connected to the actuator 22 in the form of an electric motor 23. The motor 23 is powered by a battery 44 for rotation of the torsion spring 21 from its central axis thus stressing the spring 21 providing stored spring energy. It is to be understood that the battery 44 is to be sufficiently charged to initially power the electric motor 23 in biasing the torsion spring 21 to initiate operation of the apparatus 10. The transmission means 24 of this embodiment includes a drive coupling in form of a continuous drive belt 25. The drive belt 25 is wound about the torsion spring 21 and the flywheel assembly 12 wherein release of the stored energy from the torsion spring 21 provides a driving force which:

provides a driving movement of the torsion spring 21 or in this example rotation of the torsion spring 21;

this rotation of the torsion spring 21 drives the drive belt 25 with which it cooperates;

the drive belt 25 drives the flywheel assembly 12 with which it also cooperates.

Figure 4:
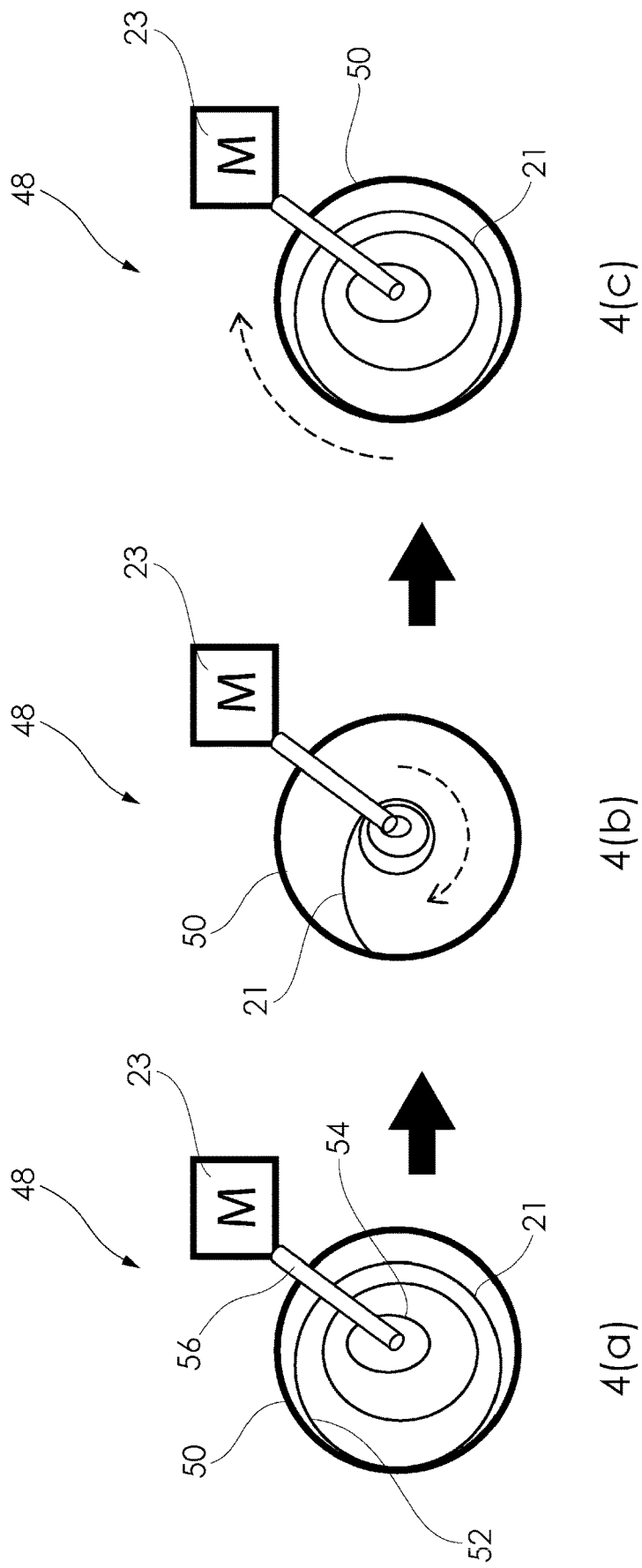
FIG. 4 is a schematic illustration of the drive means including biasing means and an actuator taken from the embodiment of FIGS. 2 and 3.

As seen in FIG. 4 the spiral torsion spring 21 is part of a torsion spring assembly 48 within which the torsion spring 21 is mounted. The torsion spring 21 is housed axially within a cylindrical housing 50 of the spring assembly 48. An outer end region 52 of the torsion spring 21 is fixed internally of the cylindrical housing 50 whereas an inner end region 54 of the spring 21 is connected to an axle 56 of the motor 23. FIG. 4 illustrates the following sequence of events in biasing the torsion spring 21 in order to provide stored energy and thereafter releasing that stored energy as a driving force from the torsion spring 21:

At FIG. 4(a) the motor 23 is rotated in one direction progressively stressing the torsion spring 21 from its relatively relaxed condition toward its fully stressed condition in FIG. 4(b);

Between FIGS. 4(b) and 4(c) the stressed torsion spring 21 at a predetermined tension releases its stored spring energy providing the driving force by rotating the cylindrical housing 50 in said one direction until the stressed torsion spring 21 releases at least some of its stored spring energy.

As best seen in FIGS. 1 and 4, the drive motor 23 is actuated or powered for a rapid biasing or stressing of the torsion spring 21 for a reduced period of time. It is understood that this reduced or shortened period which occurs between FIGS. 4(a) and 4(b) is effective in improving the resultant efficiency of the drive operation in stressing the spring 21 and thus providing the stored spring energy. The reduced period of time may vary and is largely dependent on the spring constant for the torsion spring 21, and the torque provided by the motor 23. In this example the relatively short period of time is not expected to exceed around 5 seconds. This means the drive motor 23 is intermittently powered or cycled to only rotate in the course of biasing or tensioning the spring 21. The subsequent release of the stored energy in providing the driving force on rotation of the spring assembly 48 occurs between the stages shown in FIGS. 4b and 4c.

In this embodiment the torsion spring 21 is also designed to be biased a reduced rotational displacement via the drive motor 23. This means the torsion spring 21 is rotationally displaced a fraction only of the maximum rotational displacement achievable with the torsion spring within its elastic range. It is understood that this reduced displacement is effective in further improving the resultant efficiency of the drive operation in stressing the spring 21 and thus providing the stored spring energy.

The torsion spring 21 or other biasing means may in FIG. 4 be stressed and released in stages rather than a single cycle or pulse. In this variation the spring 21 may be stressed in a succeeding stage without full relaxation of the spring 21 from a previous stage. It is understood that the torsion spring 21 in particular is more efficient in this staged mode of operation. In an alternative arrangement not illustrated, the drive belt is wrapped about the torsion spring assembly or other biasing means and a relatively small diameter spindle associated with the flywheel assembly. In this alternative embodiment it will be understood that the rotational travel of the flywheel assembly is, for a given rotational displacement of the torsion spring assembly, greater than other embodiments described herein. It will also be understood that the torsion spring assembly applies less torque in driving the small diameter spindle, compared to the large diameter of the flywheel assembly of other embodiments described herein.

As best envisaged in the context of FIGS. 1 and 4, the apparatus 10 may be modified to increase the mechanical efficiency at which the flywheel assembly 12 is driven by the drive means 14. This modification would typically involve increasing the gearing ratio (leverage or amplification) provided by the biasing means 20 to the flywheel assembly 12. In the context this embodiment the increased gearing increases the drive force provided by the spring assembly 48 to rotate the flywheel assembly 12 at a given rotational speed. The rotational speed of the spring assembly 48 is thus increased by a factor approximately proportional to the increased gearing ratio. This increased gearing may be achieved with meshed gears or a block and tackle purchase arrangement associated with the biasing means 20 or at least in part forming the transmission means 24.

In this modification of certain embodiments, the spring assembly 48 would release its stored energy at an increased rotational speed over a reduced period of time. The reduced time will be approximately inversely proportional to the increased rotational speed of the spring assembly 48 achieved by the increased gearing ratio. This means the driving force provided by the spring assembly 48 or other biasing means is proportionally amplified with increased gearing. The driving force is required for a shorter period of time to rotate the flywheel assembly prior to rapid extraction of its momentum. In approximate terms if the gearing ratio was increased by a factor of 2 then the driving force and rotational speed of the spring assembly 48 would increase by a factor of 2 and the spring assembly 48 would release its stored spring energy in providing the driving force for around half the period of time (compared to the apparatus without increased gearing). This means additional energy efficiencies can be achieved in this geared modification of the apparatus with more cycles of the spring assembly within a given period of time (compared to the apparatus without gearing).

Although not illustrated or included in this embodiment, the drive means 14 may also include a drive clutch designed to disengage the biasing means 20 from the actuator 22 substantially simultaneous with or shortly after the stored energy in the biasing means being at least predominantly released. This disengagement may occur simultaneous with or slightly after FIG. 4(c) where the torsion spring 21 is at its relatively relaxed condition. This disengagement via the drive clutch enables the torsion spring 21 to continue to rotate independent of the actuator 22 without the drag of the drive motor 23. Alternatively the torsion spring 21 may be released or disengaged from the transmission means 24 at this stage in the cycle.

The torsion spring may be one of a bank of torsion springs sharing a common actuator. The springs may be arranged in parallel with a drive shaft of the actuator fixed to each of them wherein actuation of the actuator simultaneously biases or stresses the bank of springs. The springs in parallel then together release their stored energy to provide the driving force to the flywheel assembly. Alternatively the springs may be arranged in series with the drive shaft of the actuator fixed to one only of the springs with adjacent springs connected to one another. The springs in series consecutively release their stored spring energy to provide the driving force to the flywheel assembly. This simultaneous or staged release of the stored spring energy increases either the driving force or the rotational travel of the flywheel assembly in order to increase the momentum of the flywheel assembly prior to rapid extraction of this momentum.

Figure 5:
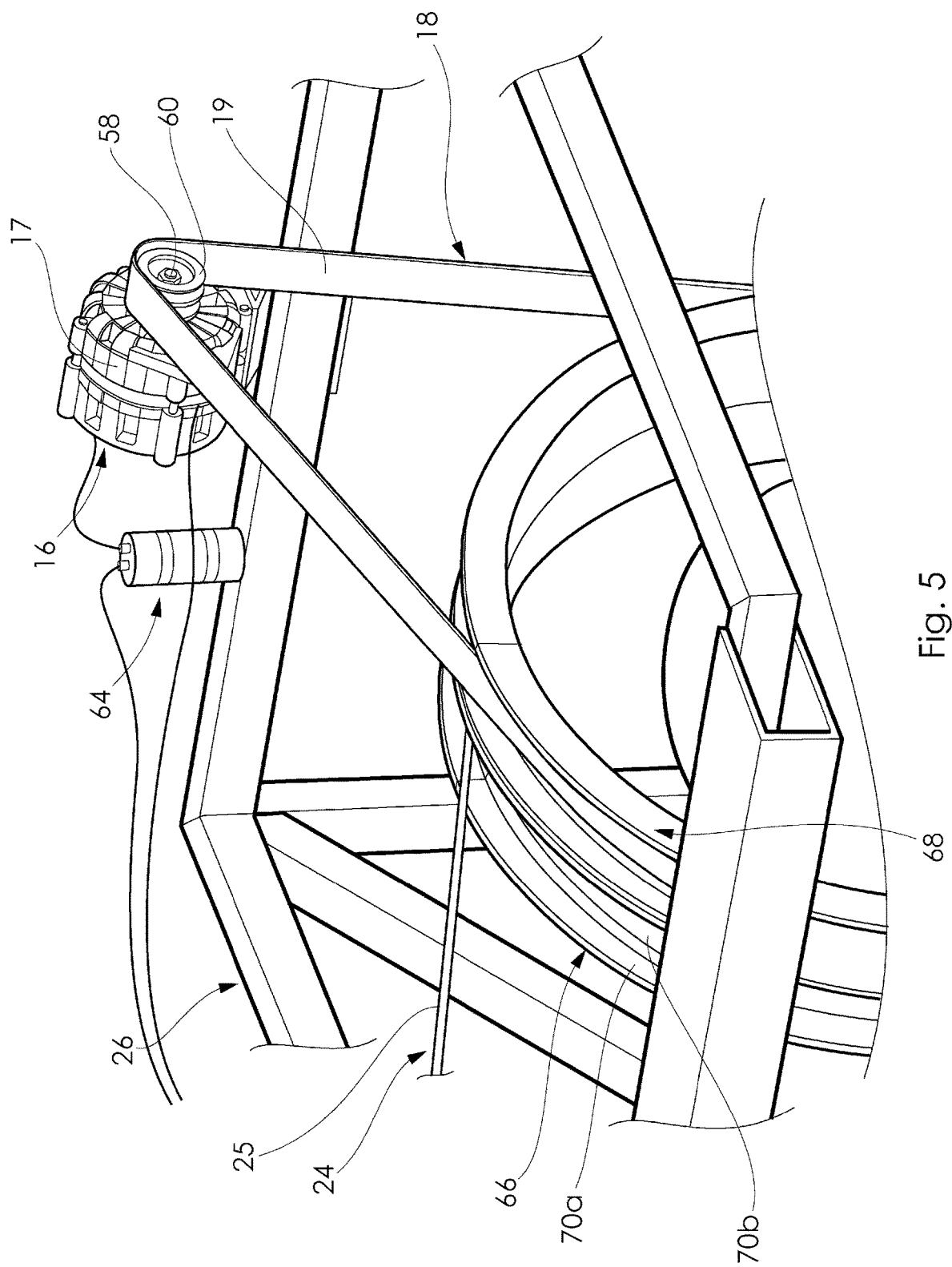
FIG. 5 is a perspective view of extraction means and an energy generator taken from the apparatus of the embodiment of FIG. 1.

FIG. 5 illustrates the energy generator 16 together with part of the extraction means 18 of this embodiment of the apparatus 10. The generator 16 is in the form of an electromagnetic generator 17 including a rotor mounted within a stator (neither is shown). The rotor includes a rotor shaft 58 axially fixed to a small diameter rotor pulley 60. The extraction means 18 of this embodiment includes an extraction coupling assembly in the form of a continuous extraction belt 19 wrapped about the rotor pulley 60 and the large diameter flywheel assembly 12. The extraction means 18 is thus configured to rapidly extract the momentum of the flywheel assembly 12. The extraction coupling assembly may also include a gear assembly (not shown) operatively coupled to the flywheel assembly 12 and the energy generator 16 to increase rotational speed of the generator 16. This increase in speed relative to the flywheel assembly 12 may be effected by one of a variety of conventional gear assemblies including a continuously variable transmission (not shown). The continuously variable transmission not only increases the rotational speed of the generator 16 but also initially provides a buffer between the extraction means 18 and the rotor of the generator 16. This buffer which will later be described in more detail provides a cushion for gradual acceleration of the rotor of the generator 16 for rapid rotation on extraction of the momentum of the flywheel assembly 12.

Typically, the extraction means 18 or more particularly the extraction coupling assembly is disengaged from either the flywheel assembly 12 or the generator 16 whilst the flywheel assembly 12 is under the influence of the drive means 14. The extraction coupling assembly is arranged to engage either the flywheel assembly 12 or the generator 16 once the flywheel assembly 12 has built up sufficient momentum and for example is coasting. The extraction means 18 may include an extraction clutch (not shown) for this purpose. In this example the rotational speed of the rotor pulley 60 relative to the flywheel assembly 12 is expected to be at a ratio of around 100 to 1. This means that for a flywheel assembly 12 having a rotational speed of around 60 to 120 rpm, the rotor pulley and associated rotor of the electromagnetic generator 16 will rotate at around 6000 to 12000 rpm.

The electromagnetic generator 16 is in the form of an alternator which on rotation of the rotor pulley 60 and associated rotor generates electricity in a conventional manner. In this embodiment the electricity is stored in one or more capacitors such as 64. It is understood that the capacitors 64 are particularly well suited to storing the electricity which is generated on relatively rapid rotation of the electromagnetic generator 16. Although not illustrated, the electricity generated by the generator 16 or stored within the capacitor 64 may in a closed-loop configuration of the apparatus 10 be recycled to power the actuator 22 of the drive means 14. In the embodiment of the preceding figures the actuator 22 is powered via the battery 44 which is recharged utilising electricity generated by the generator 16 or stored in the capacitor 64.

The buoyant drum 30 of the flywheel assembly 12 includes a pair of relatively large pulleys 66 and 68 formed integral with the buoyant drum 30. The pulleys such as 66 are located centrally of the buoyant drum 30 and each formed by an opposing pair of continuous rails 70a and 70b located about a periphery of the buoyant drum 30. The drive belt 25 engages or wraps about one of the pulleys 66 whereas the driven belt 19 wraps about the other pulley 68. The drive belt 25 and the driven belt 19 are sufficiently tensioned to provide the required rotation of the flywheel assembly 12 and the generator 16. The drive belts 25 and/or the driven belt 19 may be ribbed or toothed in order to sufficiently grip or engage their associated rotating components.

The apparatus 10 may be scaled up or down depending on the power requirement to which it will be applied. The apparatus 10 may be one of a plurality of the apparatus of the same or different scales or sizes but networked with one another. The particular configuration of the networked apparatus may vary but includes apparatus configured in a branching arrangement. The flywheel assembly 12 of certain embodiments may be driven by a modular form of the drive means 14 including multiple biasing means/actuator modules operatively coupled to the flywheel assembly 12 via common transmission means 24. The mass of the flywheel assembly 12 is expected to dictate the number of biasing means/actuator modules or scaling required to drive the flywheel assembly 12. The biasing means/actuator modules are expected to be staged or consecutive in operation thereby releasing the stored energy in the biasing means to provide the driving force sufficient for rotation of the flywheel assembly 12. Similarly, the energy generator 16 may be provided as multiple electromagnetic generator modules operatively coupled to common extraction means 18. The generator modules may simultaneously generate electricity or be synchronised to generate electricity in consecutive stages or cycles.

In a variation on this embodiment of the apparatus 10, the extraction means 18 may include a buffer (not shown) arranged between the extraction means 18 and the rotor of the generator 16. The buffer may be in the form of a torsion spring such as the spring assembly of FIG. 4 designed in this case to gradually accelerate the rotor of the generator 16 for rapid rotation on extraction of the momentum of the flywheel assembly 12. In this variation the driven belt 19 wraps about the cylindrical housing 50 which is equivalent to the rotor pulley 60 of the preceding embodiment. The inner end region 54 of the torsion spring 21 is coupled to the rotor shaft 58 whereby:

the initial rotation of the housing 50 under the influence of the driven belt 19 distorts the spring 21 without rotation of the rotor shaft 58;

the spring 21 at a threshold tension initiates rotation of the rotor shaft 58 which gradually accelerates in its rotation;

the torsion spring 21 reaches its limit of distortion at which stage the rotor shaft 58 has accelerated to a rotational speed substantially equal to that of the cylindrical housing 50.

Figure 6:
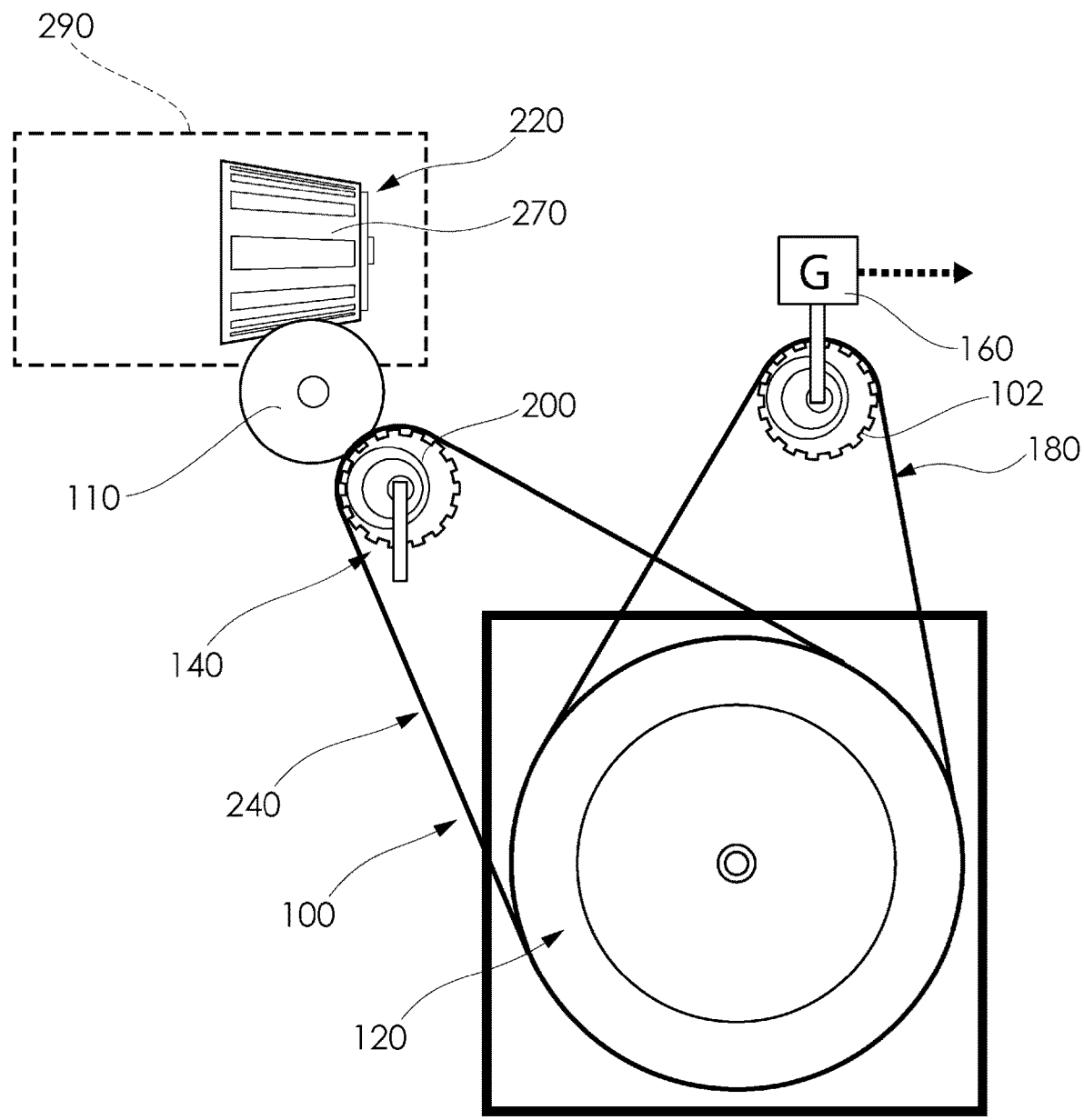
FIG. 6 is a schematic illustration of a second embodiment of an apparatus for producing energy according to the disclosure.
Figure 7:
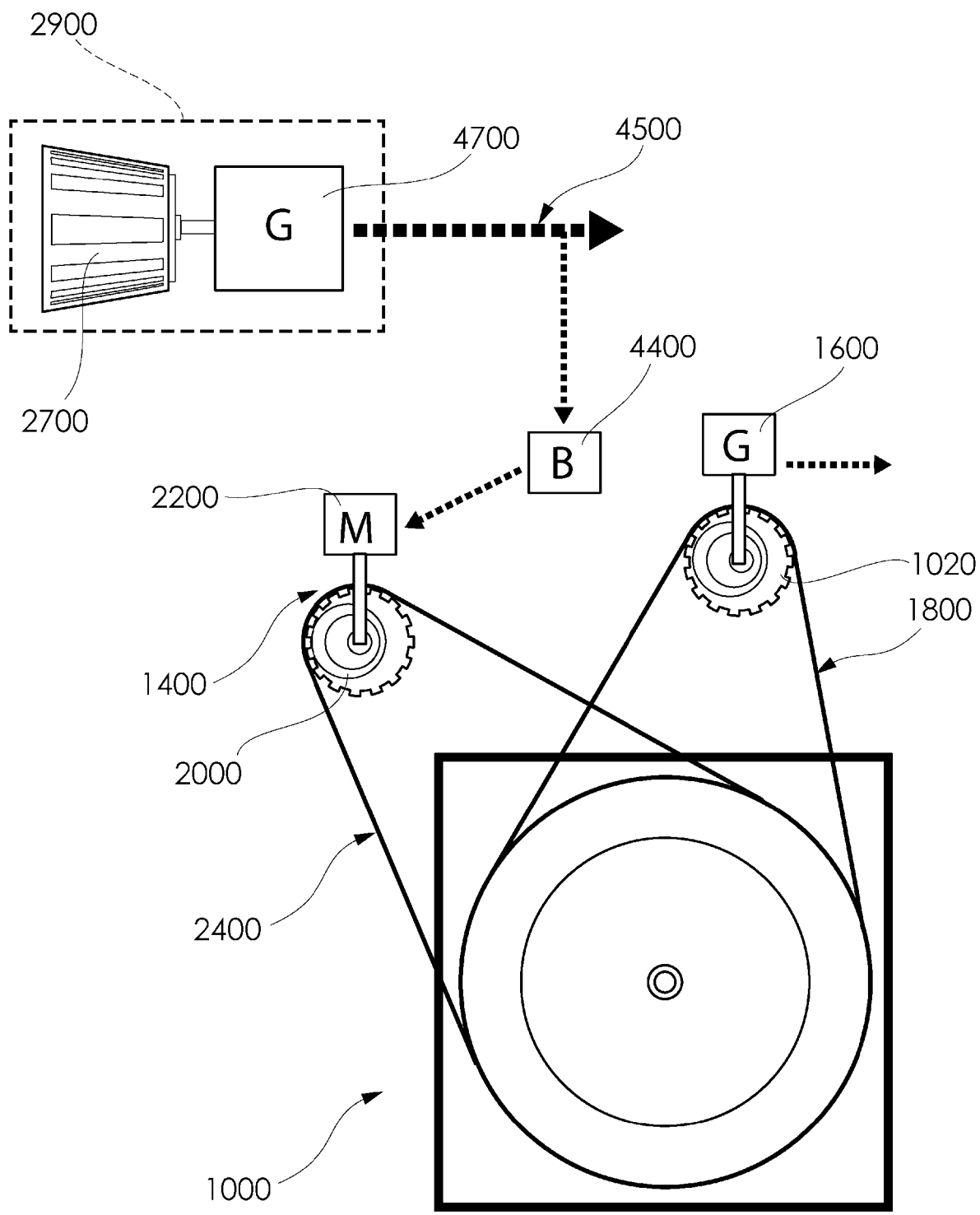
FIG. 7 is a schematic illustration of a third embodiment of an apparatus for producing energy according to the disclosure.

FIGS. 6 and 7 schematically illustrate second and third embodiments of the apparatus for producing energy. The apparatus in both cases is effectively the same as the apparatus 10 of the preceding embodiment of FIGS. 1 to 5. For ease of reference and in order to avoid repetition, the same reference numerals with an additional "0" or "00" has been used for corresponding components. For example, the flywheel assembly of the embodiment of FIG. 6 has been designated as 120 and the flywheel assembly of FIG. 7 designated as 1200.

In the second embodiment of FIG. 6, the drive means 140 includes an actuator 220 coupled to the biasing means 200 via an intermediate clutch 110. The actuator 220 in this embodiment is in the form of a rotating turbine 270 such as that present in a coal or gas fired power plant 290. The biasing means 200 is driven for rotation by the turbine 220 via the clutch 110. The apparatus 100 is otherwise similar in construction to the preceding embodiment except there is no requirement for utilising electricity produced by the generator 160 in powering the actuator 220. The apparatus 100 may include a gear assembly 102 operatively coupled to the generator 160 and driven by the extraction means 180. The gear assembly 102 may include or cooperate with a buffer such as that described in the preceding embodiment. The apparatus 100 of this embodiment is thus of an open-loop configuration with the energy or electricity produced being available for consumption elsewhere.

In the third embodiment of FIG. 7, the drive means 1400 is similar in construction to the first embodiment except in this case the battery 4400 is recharged via electricity from the electricity grid 4500. The electricity is generated by a fossil fuel or other generator 4700, or electrical substation, associated with a coal or gas fired power plant 2900 local to the apparatus 1000. The apparatus 1000 is thus of an open-loop configuration producing electricity for consumption elsewhere. The apparatus may thus be provided in the form of an energy module capable of retrofit to a power plant, or electrical substation, including non-renewable energy sources such as fossil fuels and uranium. Alternatively the apparatus may be in the form of an energy module capable of retrofit to a power plant, or electrical substation, including renewable energy sources such as solar, wind, wave, hydro, biomass, tide or geothermal sources.

The apparatus may vary in terms of its construction insofar as the drive means may include:

a resiliently flexible elongate member (instead of the torsion spring of certain embodiments described herein);

a linear coil spring for extension or compression in a linear action (rather than the rotational distortion of a torsion spring);

a hydraulic drive or pneumatic drive (instead of the electric motor of certain embodiments described herein).

The transmission means and/or the extraction means may include meshed gearing or other mechanical contrivances operatively coupled to the flywheel assembly. Alternatively the continuous belts may be replaced with continuous chains. The flywheel assembly may be oriented with its axis of rotation vertical rather than horizontal. The outer chamber of certain embodiments may be an open prismatic shape at its top with the bottom chamber shaped partly cylindrical or complementary to the buoyant vessel. In the absence of the outer chamber and the buoyant vessel, the flywheel assembly may be supported for rotation by magnetic or other bearings.

Figure 8:
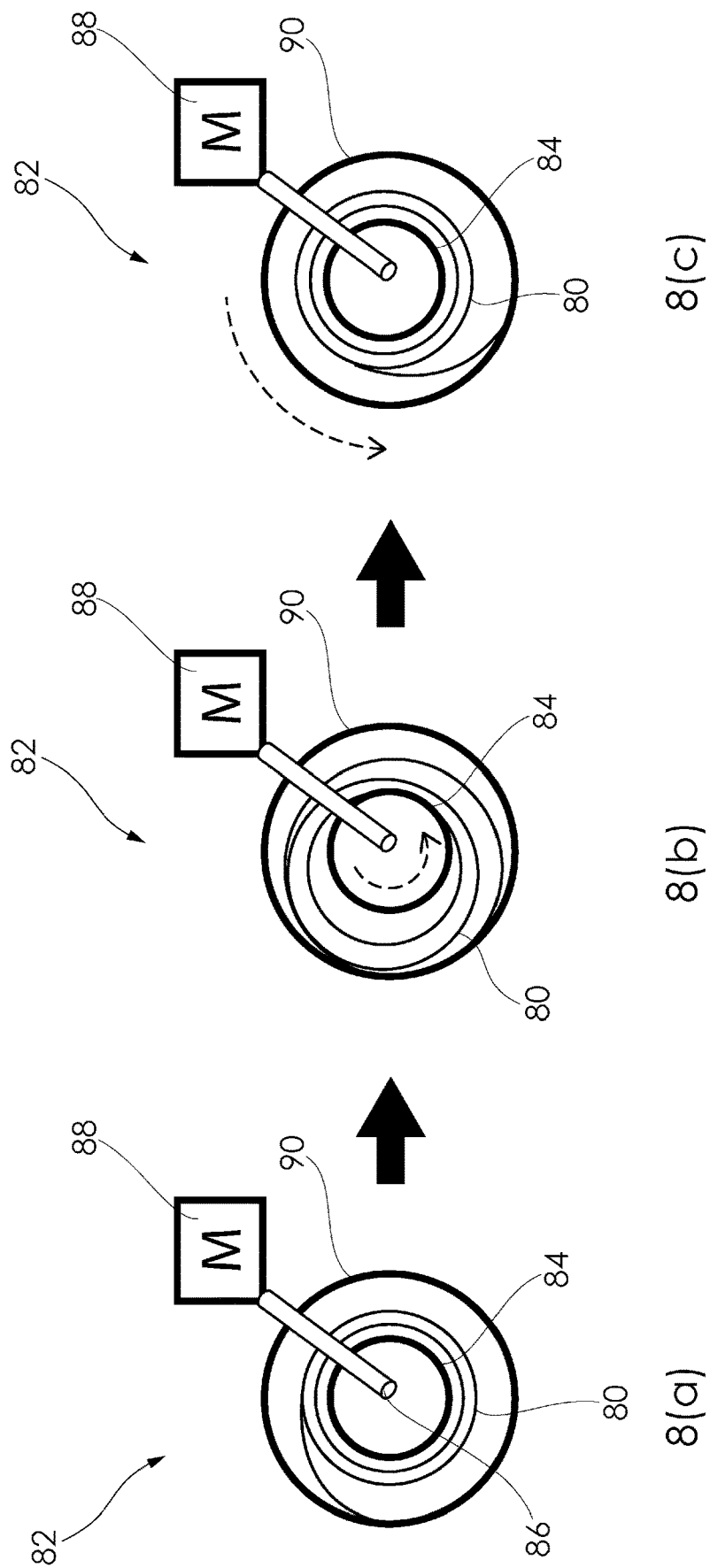
FIG. 8 is a schematic illustration of alternative drive means including alternative biasing means and an actuator.

In another embodiment and as illustrated in FIG. 8, the biasing means may include a constant torque spring 80 included in a spring assembly 82. The spring assembly 82 also includes an inner casing 84 fixed to an axle 86 of the motor 88, and an outer casing 90 to which an outermost turn of the torque spring 80 is anchored. The inner casing 84 is anchored to an innermost turn of the torque spring 80 so that actuation of the motor 88 and rotation of the associated axle 86 effects stressing of the torque spring 80. FIG. 8 illustrates the following sequence of events in biasing the torque spring 80 in order to provide stored energy and thereafter releasing that stored energy as a driving force from the torque spring 80:

At FIG. 8(a) the motor 88 is rotated in one direction progressively stressing the torque spring 80 from its relaxed condition toward its fully stressed condition in FIG. 8(b);

Between FIGS. 8(b) and 8(c) the stressed torque spring 80 at a predetermined time or displacement of the torque spring 80 releases its stored spring energy providing the driving force by rotating the outer casing 90 in said one direction until the stressed torque spring 80 releases substantially all of its stored spring energy.

Figure 9:
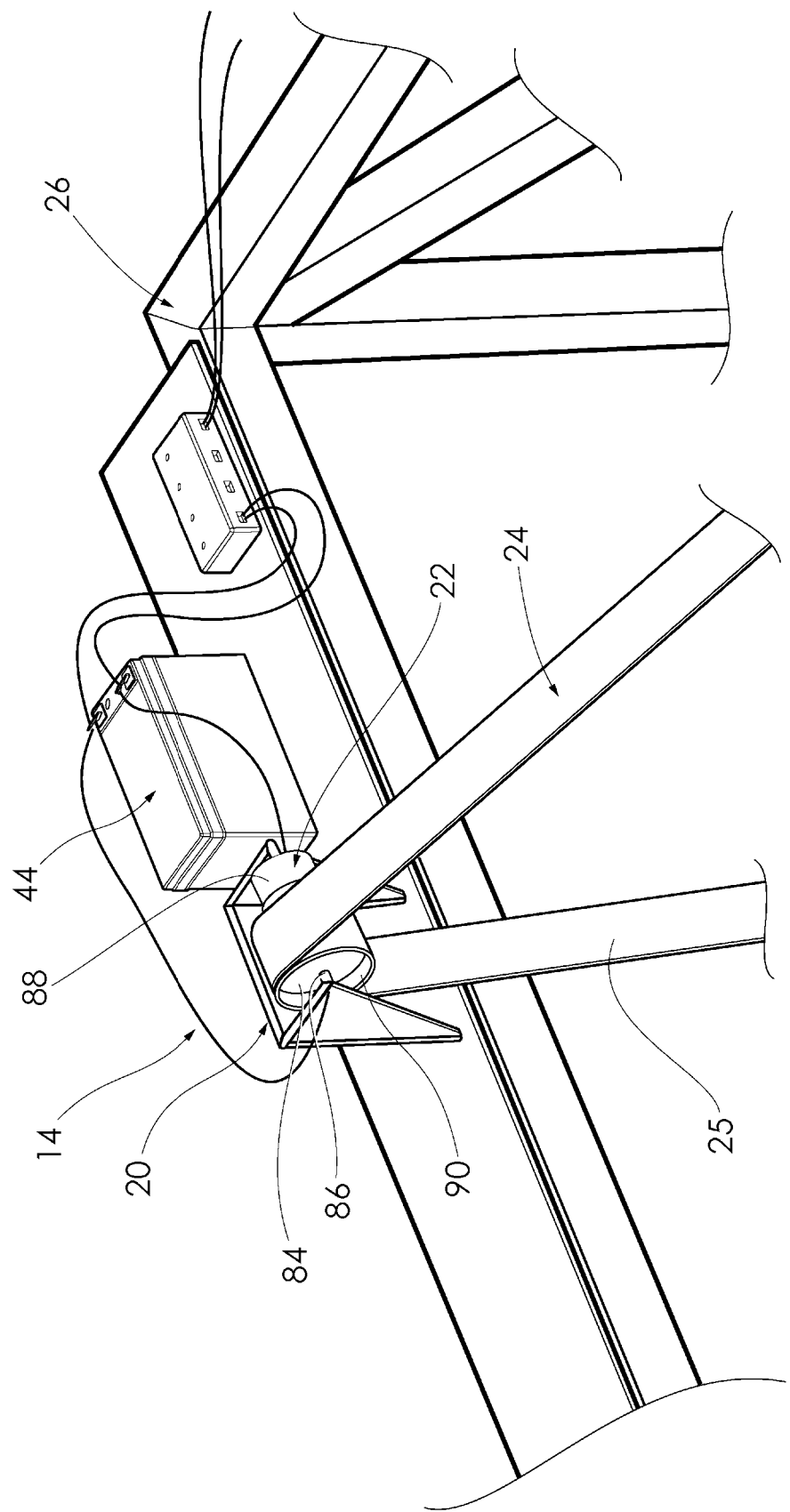
FIG. 9 is a perspective view of the alternative drive means of FIG. 8 in the context of the apparatus of FIGS. 1 to 5.

FIG. 9 shows the alternative drive means including the spring assembly 82 in the context of the apparatus of FIGS. 1 to 5. For ease of reference we have used the same reference numerals for the apparatus 10 except for the various components of the constant torque spring assembly 82.

Figure 10:
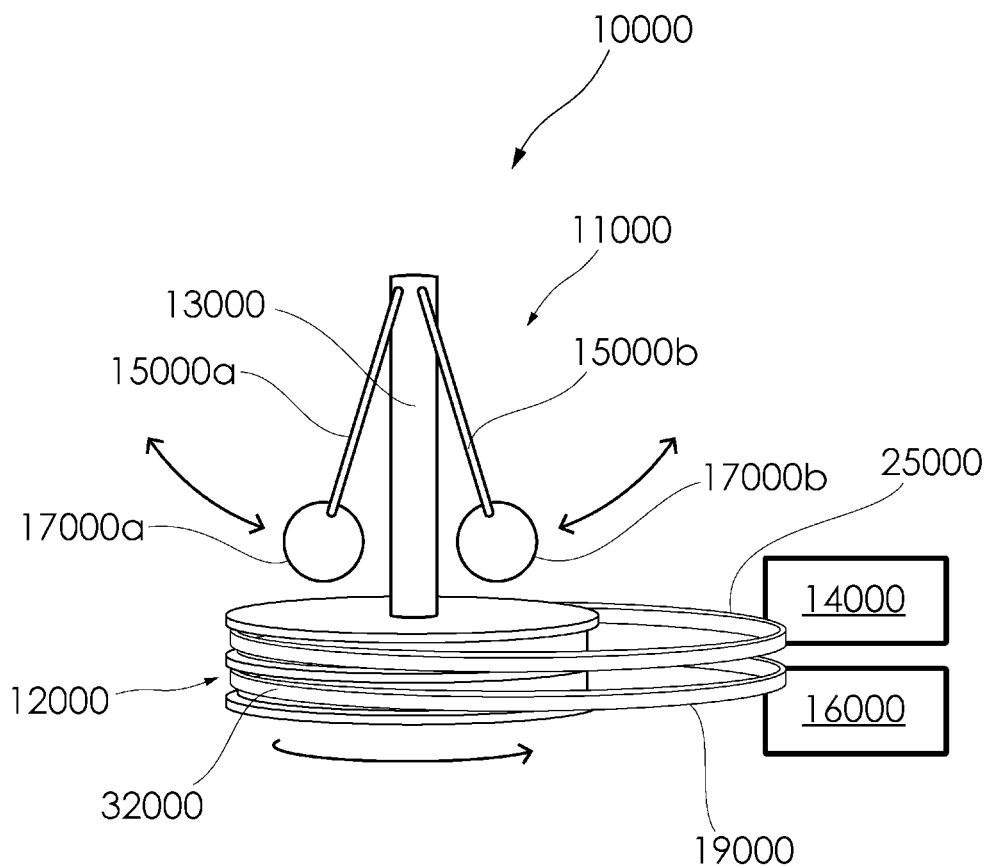
FIG. 10 is a schematic illustration of a fourth embodiment of an apparatus for producing energy according to the disclosure.

FIG. 10 is a schematic illustration of a fourth embodiment of an apparatus 10000 according to the disclosure. It is to be understood that the apparatus 10000 includes the same drive means 14000 and energy generator 16000 as the first embodiment and therefore these components are not illustrated in any detail. The flywheel assembly 12000 may in line with the first embodiment be enclosed in a buoyant vessel for rotation in an outer fluid chamber or alternatively the flywheel assembly may exclude these additional features and merely be rotated in an atmospheric space. For ease of reference and in order to avoid repetition, the same reference numerals have been used for the same components of this alternative apparatus 10000.

The apparatus 10000 primarily departs from the preceding embodiments insofar as the flywheel assembly 12000 includes a rotational member in the form of a first flywheel 32000 connected coaxially to a second flywheel 11000. In this embodiment the second flywheel 11000 includes a flywheel shaft 13000 fixed axially to the first flywheel 32000 and oriented substantially vertical. The second flywheel 11000 is in the form of a governed flywheel including a plurality of flywheel arms such as 15000a and 15000b pivotally connected to an upper region of the flywheel shaft 13000. The pivoting arms 15000a/b are weighted at their free or distal ends via respective flywheel weights 17000a/b. In operation the first flywheel 32000 is rotated via the drive means 14000 wherein:

the flywheel arms 15000a/b gradually rise in an increasing radial distance from the flywheel shaft 13000 increasing the rotational momentum of the governed flywheel 11000;

the flywheel arms 15000a/b, depending on the weights 17000a/b and the rotational speed of the first flywheel 32000, attain a predetermined height harnessing the input energy of the drive means 14000 in the form of gravitational potential energy and the rotational momentum.

The second or governed flywheel 11000 is also effective in cooperating with the first flywheel 32000 to regulate the rotational speed of the flywheel assembly 12000 at a substantially constant speed depending largely on the construction of the flywheel assembly 12000. The governed flywheel 11000 is thus dynamic in the manner it controls rotation of the flywheel assembly 12000.

The first flywheel 32000 of the flywheel assembly 12000 of this embodiment is coupled to the drive means 14000 via the continuous drive belt 25000, and the first flywheel 32000 is coupled to the energy generator 16000 via the continuous extraction belt 19000.

The apparatus 10000 in its extraction phase rapidly extracts the momentum of the flywheel assembly 12000. In the extraction phase the flywheel arms 15000a/b of the governed flywheel 11000 gradually lower toward the flywheel shaft 13000 increasing the rotational speed of the flywheel assembly 12000 which may otherwise slow. The governed flywheel 11000 thus maintains rotation of the flywheel assembly 12000 at a substantially constant rotational speed during this extraction phase. It is also understood that the governed flywheel 11000, in maintaining the substantially constant rotational speed of the flywheel assembly 12000 in both its drive and extraction phases, provides improved efficiency compared to the preceding embodiments of the disclosure. The size and mass of the first flywheel 32000 may be reduced from the preceding embodiments on the understanding that the governed flywheel 11000 promotes rotation of the flywheel assembly 12000 as the flywheel arms 15000a/b drop and the momentum of the flywheel assembly 12000 is rapidly extracted. In an alternative embodiment the rotating member may have reduced mass where it effectively does not function as a flywheel in which case the flywheel assembly 12000 is limited to a single flywheel in the form of the governed flywheel 11000 only. In this variation the rotating member may be in the form of a rotating platform which both supports the governed flywheel 11000 and provides for coupling of the drive belt 25000 and the extraction belt 19000.

In each of the preceding embodiments and according to another aspect of the disclosure there is provided a method for producing energy. The method in the context of the first embodiment involves the following general steps:

actuating biasing means 20 associated with a flywheel assembly 12, said actuation providing stored energy in the biasing means 20;

releasing the stored energy in the biasing means 20 in the form of a driving force to the flywheel assembly 12 to effect its rotation whereby the flywheel assembly 12 gains momentum;

rapidly extracting the momentum of the flywheel assembly 12;

generating energy via an energy generator 16 arranged to harness the rapidly extracted momentum of the flywheel assembly 12.

In improving the efficiency of the apparatus 10, the biasing means 20 is actuated rapidly by an actuator 22 for a reduced period of time. In the first embodiment this means power is supplied to the drive motor 23 for a reduced period of time improving the resultant efficiency of the drive operation in biasing the biasing means 20 and providing the stored energy. As described in the context of the apparatus 10, the biasing means 10 may be partly displaced or distorted a fraction of its maximum range of elastic displacement. In certain embodiments, the drive motor 23 may be intermittently powered or pulsed for periods of less than 5 seconds.

In releasing the stored energy in the biasing means 20 in providing the drive force, it may be preferable to disengage the biasing means 20 from either the actuator 22 or the transmission means 24. This disengagement may occur substantially simultaneous with or shortly after the stored energy in the biasing means 20 being predominantly released thereby permitting continued rotation of the flywheel assembly 12 independent of the actuator 22. This disengagement may occur at a predetermined period after each cycle or pulse of the intermittent powering of the actuator or drive motor 23. The biasing means 20 must then be reengaged with the actuator 22 prior to its next power cycle. The drive dynamic may involve more than one winding of the spring or other biasing means 20 until the flywheel assembly 12 achieves a desired rotational speed. In any case the actuator 22 or drive motor 23 is halted to provide an anchor for the biasing means 20 to rotate against in providing the required driving force.

In this embodiment, the rapid extraction of the momentum of the flywheel assembly 12 involves rapid rotation of the energy generator 16 relative to the flywheel assembly 12. In this case the ratio of the rotational speed of the rotor of the generator 16 relative to the flywheel assembly 12 is at least around 100 to 1. The generator 16 may be geared with the extraction means 18 in order to increase the relative rotational speed of the generator 16 for rapid extraction of the flywheel 12 momentum.

In its closed-loop mode the apparatus 10 recycles or extracts energy or electricity it produces for actuating the actuator 22 and biasing the biasing means 20. In an open-loop mode, the apparatus 10 or more particularly the actuator 22 of the drive means 14 is powered or driven externally.

Now that several embodiments of the disclosure have been described it will be understood that the apparatus for producing energy has at least the following advantages:

it harnesses the momentum of a flywheel assembly rotating at a relatively low rotational speed in efficiently producing energy;

the momentum of the flywheel assembly is rapidly extracted by extraction means associated with an energy generator for generating energy;

the drive means includes biasing means which effectively stores and releases energy to the flywheel assembly in the form of a driving force via transmission means providing the requisite rotation of the flywheel assembly which thus gains momentum.

Those skilled in the art will appreciate that disclosure described herein is susceptible to variations and modifications other than those specifically described. For example, the flywheel assembly may be simplified to a weighted flywheel without flotation in an outer chamber, provided adequate low friction bearings are incorporated in the design. The biasing means may depart from the torsion spring described herein and extends to other forms of springs including but not limited to compression or extension or other coil springs, constant force springs, leaf springs, or devices with an elastic storage and return dynamic. The transmission and extraction means may vary from the drive belts disclosed herein provided the stored energy in the biasing means is released as the driving force for transmission to the flywheel assembly for its rotation, and the extraction means provides rapid extraction of the momentum of the flywheel assembly. In this embodiment the driving force is a fundamental force in the form of a spring force. Alternatively the driving force may be in the form of a gravity force such as a buoyancy force. The biasing means may depart from springs depending on the required or designed driving force for the apparatus where, for example, the biasing means is in the form of a buoyant container associated with the flywheel assembly and submerged in the fluid of the outer chamber of certain embodiments. All such variations and modifications are to be considered within the scope of the present disclosure the nature of which is to be determined from the foregoing description. As such, it is clear that the present disclosure includes variations that are not specifically described and fall within the scope of the protection of the following claims. Accordingly, various changes and modifications to the presently disclosed embodiments will be apparent to those skilled in the art.

The invention claimed is:

1. An apparatus comprising:
a flywheel assembly arranged for rotation;
drive means operatively coupled to the flywheel assembly, the drive means including a torsion spring connected to an actuator arranged to bias the torsion spring: (i) in consecutive stages wherein the torsion spring is biased in a succeeding of the consecutive stages prior to full relaxation of the torsion spring in a preceding of the consecutive stages, and (ii) in each of the consecutive stages, a reduced displacement relative to a maximum displacement is achievable with the torsion spring to provide stored energy in the torsion spring;
transmission means coupled between the flywheel assembly and the torsion spring wherein a release of the stored energy in the torsion spring in each of the consecutive stages provides a driving force that drives the transmission means to effect rotation of the flywheel assembly which gains momentum; and
an extraction clutch operatively coupled to an extraction coupling assembly arranged to cooperate with the flywheel assembly to actuate a generator, the extraction clutch arranged to:
  (a) disengage the extraction coupling assembly from one of the flywheel assembly and the generator while the flywheel assembly is under the influence of the torsion spring to enable a rotation of the flywheel assembly by the transmission means independent of the extraction coupling assembly, and
  (b) engage the extraction coupling assembly with one of the flywheel assembly and the generator once the flywheel assembly has built up a sufficient amount of momentum and is coasting.

2. The apparatus of claim 1, wherein the actuator includes a drive motor coupled to the torsion spring which is biased under the influence of the drive motor to provide the stored energy in the torsion spring.

3. The apparatus of claim 2, wherein the drive motor is rotated to stress the torsion spring to provide the stored energy which, on release, provides the driving force of the torsion spring.

4. The apparatus of claim 3, wherein the torsion spring is configured to be wound relative to the transmission means via the drive motor for stressing of the torsion spring which is arranged to release the stored energy to provide the driving force for rotation of the flywheel assembly.

5. The apparatus of claim 2, wherein the drive motor is designed to rapidly bias the torsion spring for a reduced period of time to provide the stored energy in the torsion spring.

6. The apparatus of claim 1, wherein the torsion spring has a spring constant.

7. The apparatus of claim 1, further comprising:
extraction means operatively coupled to the flywheel assembly for rapid extraction of the momentum of the flywheel assembly; wherein the generator is associated with the extraction means to generate energy from the rapidly extracted momentum of the flywheel assembly.

8. The apparatus of claim 7, wherein the extraction means includes the extraction coupling assembly arranged to cooperate with the flywheel assembly for rapid rotation of the generator relative to the flywheel assembly.

9. The apparatus of claim 7, wherein the flywheel assembly includes a rotating member connected to a flywheel, the rotating member operatively coupled to both the drive means and the extraction means.

10. The apparatus of claim 9, wherein the flywheel includes a shaft oriented substantially vertical and fixed coaxially to the rotating member, a plurality of pivoted arms each at or adjacent one end pivotally coupled to the shaft, and a plurality of weighted elements connected to an opposing end of respective of the plurality of pivoted arms.

11. The apparatus of claim 1, further comprising a drive clutch arranged to disengage the torsion spring from the actuator in association with the stored energy in the torsion spring being predominantly released.

12. The apparatus of claim 11, wherein the disengagement occurs simultaneously with the stored energy in the torsion spring being predominately released.

13. The apparatus of claim 11, wherein the disengagement of the torsion spring from the actuator enables the continued rotation of the flywheel assembly independent of the actuator.

14. A method for storing energy, the method comprising:
actuating a torsion spring associated with a flywheel assembly, the actuation of the torsion spring biasing the torsion spring: (i) in consecutive stages wherein the torsion spring is biased in a succeeding of the consecutive stages prior to full relaxation of the torsion spring in a preceding of the consecutive stages, and (ii) in each of the consecutive stages, a reduced displacement relative to a maximum displacement is achievable with the torsion spring to provide stored energy in the torsion spring;
releasing the stored energy in the torsion spring in each of the consecutive stages to provide a driving force to the flywheel assembly to effect rotation of the flywheel assembly which gains momentum;
disengaging an extraction coupling assembly operatively coupled to an extraction clutch from one of the flywheel assembly and a generator to enable a rotation of the flywheel assembly by a transmission means independent of the extraction coupling assembly; and
engaging the extraction coupling assembly with one of the flywheel assembly and the generator once the flywheel assembly has built up a sufficient amount of momentum and is coasting.

15. The method of claim 14, wherein actuation of the torsion spring is performed rapidly for a reduced period of time to provide the stored energy in the torsion spring compared to a relatively slow biasing of the torsion spring for an extended period of time.

16. The method of claim 14, further comprising governing the rotational speed of the flywheel assembly at a substantially constant speed.

17. The method of claim 14, further comprising:
rapidly extracting the momentum of the flywheel assembly; and
generating energy via the generator arranged to harness the rapidly extracted momentum of the flywheel assembly.

18. The method of claim 17, wherein rapidly extracting the momentum of the flywheel assembly comprises rapidly rotating the generator relative to the flywheel assembly.

19. The method of claim 14, further comprising disengaging, by a drive clutch, the torsion spring from the actuator in association with the stored energy in the torsion spring being predominantly released.

20. The method of claim 19, wherein the disengagement occurs simultaneously with the stored energy in the torsion spring being predominately released.

21. The method of claim 19, wherein the disengagement of the torsion spring from the actuator enables the continued rotation of the flywheel assembly independent of the actuator.

22. A storage apparatus comprising:
a flywheel assembly arranged for rotation;
drive means operatively coupled to the flywheel assembly, the drive means including torsion spring connected to an actuator arranged to bias the torsion spring: (i) in consecutive stages wherein the torsion spring is biased in a succeeding of the consecutive stages prior to full relaxation of the torsion spring in a preceding of the consecutive stages, and (ii) in each of the consecutive stages, a reduced displacement relative to a maximum displacement is achievable with the torsion spring to provide stored energy in the torsion spring;
transmission means coupled between the flywheel assembly and the torsion spring wherein a release of the stored energy in the torsion spring in each of the consecutive stages provides a driving force that drives the transmission means to effect rotation of the flywheel assembly which gains momentum; and
an extraction clutch operatively coupled to an extraction coupling assembly arranged to cooperate with the flywheel assembly to actuate a generator, the extraction clutch arranged to:
(a) disengage the extraction coupling assembly from one of the flywheel assembly and the generator while the flywheel assembly is under the influence of the drive means to enable a rotation of the flywheel assembly by the transmission means independent of the extraction coupling assembly, and
(b) engage the extraction coupling assembly with one of the flywheel assembly and the generator once the flywheel assembly has built up a sufficient amount of momentum and is coasting.

23. The storage apparatus of claim 22, wherein the actuator includes a drive motor coupled to the torsion spring which is biased under the influence of the drive motor to provide the stored energy in the torsion spring.

24. The storage apparatus of claim 23, wherein the drive motor is rotated to stress the torsion spring to provide the stored energy which, on release, provides the driving force of the torsion spring.

25. The storage apparatus of claim 24, wherein the drive motor is designed to rapidly bias the torsion spring for a reduced period of time to provide the stored energy in the torsion spring.

26. The storage apparatus of claim 22, wherein the flywheel assembly includes a rotating member operatively coupled to the drive means.

27. The storage apparatus of claim 26, wherein the flywheel assembly includes a shaft oriented substantially vertical and fixed coaxially to the rotating member, a plurality of pivoted arms each at or adjacent one end pivotally coupled to the shaft, and a plurality of weighted elements connected to an opposing end of respective of the plurality of pivoted arms.

28. The storage apparatus of claim 22, further comprising a drive clutch arranged to disengage the torsion spring from the actuator in association with the stored energy in the torsion spring being predominantly released.

29. The storage apparatus of claim 28, wherein the disengagement occurs simultaneously with the stored energy in the torsion spring being predominately released.

30. The storage apparatus of claim 28, wherein the disengagement of the torsion spring from the actuator enables the continued rotation of the flywheel assembly independent of the actuator.

\* \* \* \* \*